Patented Sept. 15, 1931

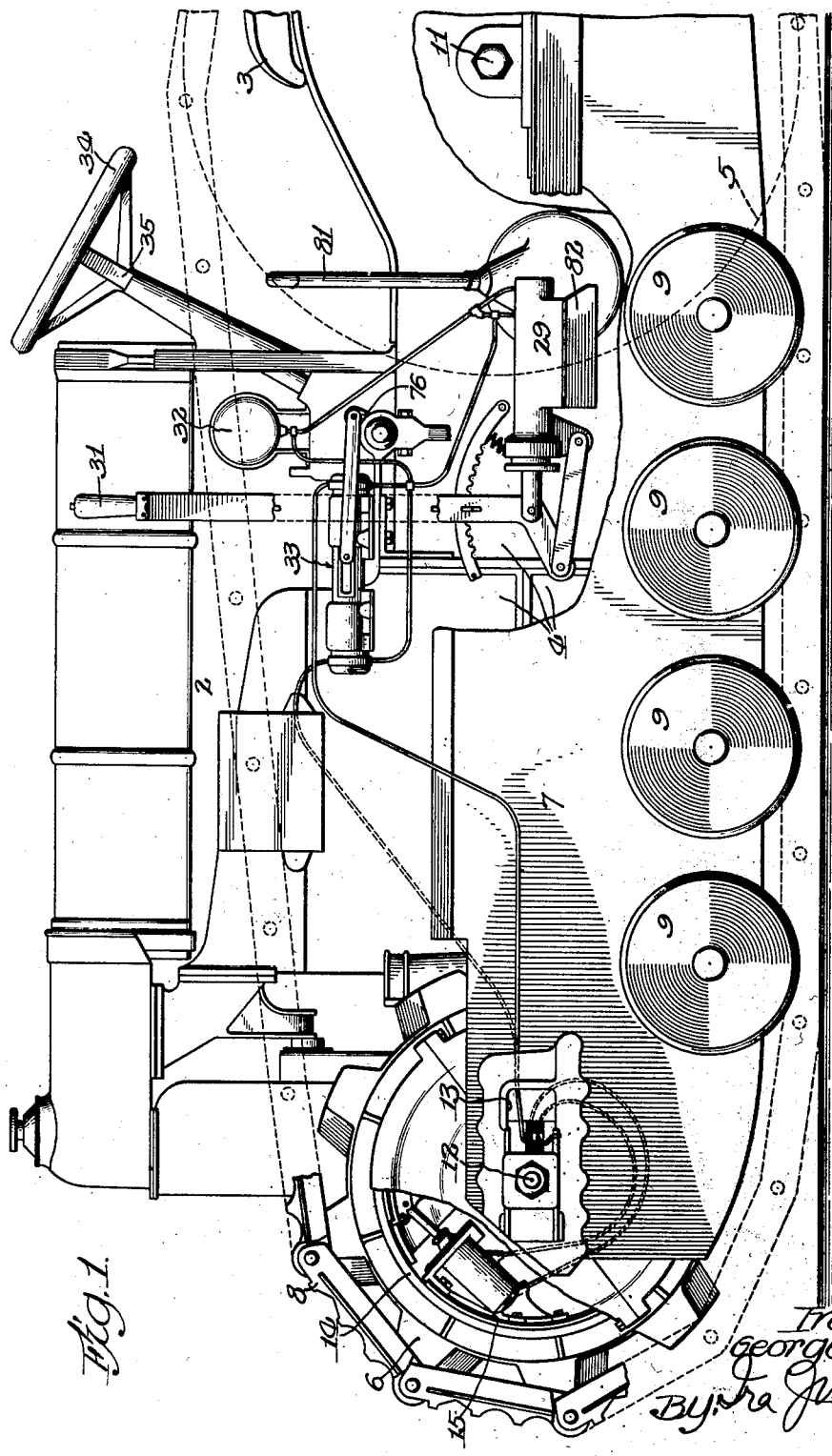

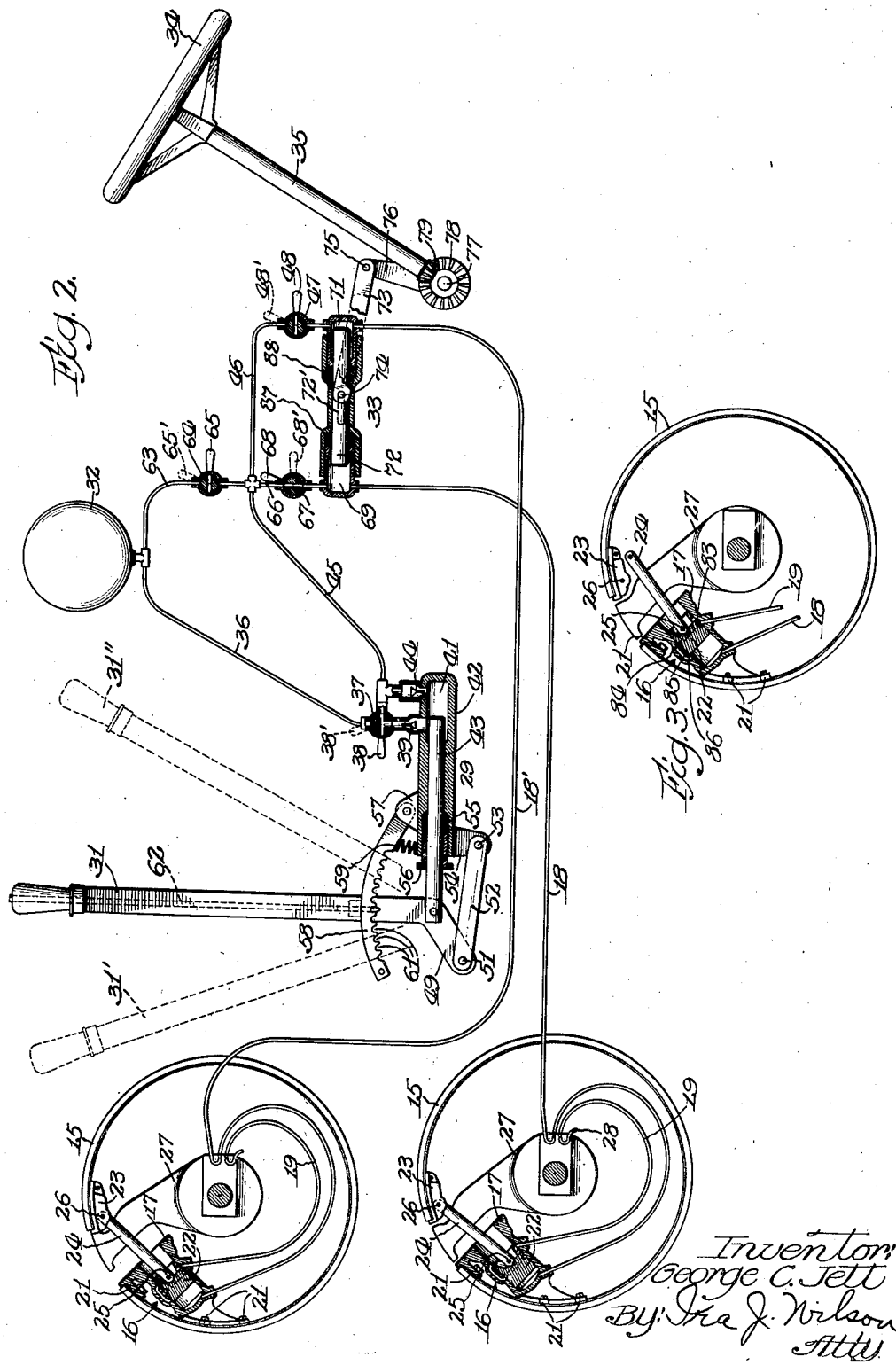

1,822,991

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

TRACTOR STEERING CONTROL MECHANISM

Application filed September 19, 1928. Serial No. 307,033.

This invention relates to steering and braking mechanisms for tractors of the track shoe loop or chain tread type, sometimes also known as track laying tractors, and more particularly to a steering and braking control mechanism and system for braking or steering, or both braking and steering such tractors. In its broader aspects the invention is adaptable to and susceptible of use in connection with apparatus or machines other than tractors. One type of tractor to which the invention is applicable is illustrated and described in my Patent No. 1,618,203, dated February 22, 1927.

One of the primary objects of this invention is to provide a steering and braking control mechanism for tractors, whether of the track shoe loop type or other type, or for other vehicles to which the invention may be adapted, capable of either steering or braking the tractor or vehicle to which it is applied by selectively braking the driving or driven wheels, or both, and by simultaneously braking the driving or driven wheels, or both, respectively.

Another important object is to provide a braking and steering control mechanism or system of the character above mentioned whereby brakes applied to at least one pair of wheels of the vehicles may be operated selectively or simultaneously, and simultaneously by either of two methods.

A further object is to provide a fluid pressure control system particularly suitable for tractors of the type first mentioned above, but useful in connection with other tractors and other vehicles adapted to be connected to and operated by the usual steering wheel or other steering gear and a hand or emergency brake lever similar to the usual emergency brake lever.

A still further object is to provide a novel type of fluid pressure generator and operating mechanism which may be termed herein a master or control cylinder mechanism and to provide a novel fluid control and operating mechanism which is adapted to serve the purpose of a pump for filling the hydraulic system with suitable fluid such as oil and as a fluid pressure generator for either operation alone or with the steering gear for applying the brakes simultaneously.

Many further objects, as well as the advantages, functions and uses of the invention, will be or should become fully understood and appreciated after reading the following description and claims, and after viewing the drawings in which:

Fig. 1 is a side elevational view of the major portion of the length of a tractor of the chain tread or track laying type with parts broken away and parts more or less diagrammatically illustrated showing one form of my invention applied thereto, Fig. 2 is a diagrammatic illustration of one pair of brakes for either the driving or driven wheels or sprockets for a tractor or other vehicle and of the control system by which they are controlled and operated as brakes or as a means of steering the tractor, and Fig. 3 is a more or less diagrammatic showing of one of the brakes with its parts positioned for filling the hydraulic system with oil or other suitable fluid.

The tractor illustrated is of a well known type. It includes a power plant generally designated 2, a driver's seat 3, a body, chassis or frame structure portions of which are designated 4 upon which the power plant and other superstructure are supported and which in turn are supported upon or by the sprockets and chain treads, a rear and, in this instance, a driving sprocket diagrammatically illustrated and designated 5, in this instance a driven creeper sprocket 6, side frame members 7 between which the driving and driven creeper sprockets are rotatably mounted, and track shoe loops or chain treads generally designated 8 engaged about the driving sprocket 5 and the driven sprocket 6 on each side of the tractor body or chassis. Each of the side frame members is on each of its sides equipped with a plurality of oppositely disposed bearing rollers 9 equipped with flanges to travel upon and guide the track shoe loops or chain treads 8 for assisting in supporting the weight of the tractor. The constructional details and arrangements of the parts thus far described are more or less immaterial to the invention, although useful herein in illustrating an application of the invention. If further reference to these parts is desired, it may be had by reference to a similar type of construction illustrated and described in my aforementioned Patent No. 1,618,203.

The driving and driven sprockets are mounted on suitable axles or in suitable bearings the centers of which are designated 11 and 12, respectively, for rotation, and the front or driven creeper sprockets are preferably adjustably mounted in longitudinal slots 13 in the side frame members after the manner illustrated, described and claimed in my Patent No. 1,583,157, dated May 4, 1926, so that the track shoe loop may be slacked up and have its slack taken up as and when desired. The driving sprockets are preferably arranged to be differentially driven through a differential (not shown) from the power plant 2. The track shoe loops 8 are accordingly differentially driven and thus differentially drive the driven wheels 6. While I have illustrated but one side of the tractor in Fig. 1, it will be understood and appreciated that the opposite side is very similar thereto. Consequently, a description of the side illustrated should suffice for both.

A pair of the creeper sprockets, in this instance the front and driven creeper sprockets 6, preferably on their inner sides, that is, their sides nearest the power plant or chassis of the tractor, is provided with brake drums 14 (one shown) against the inner surfaces of which brake bands 15 are adapted to be pressed by hydraulically operated brake operating mechanisms generally designated 16. These brake operating mechanisms 16 are similar in construction and therefore a description of one should suffice for all. Cylinders 17 connected with fluid pressure supply lines 18 and 18' and overflow lines 19 and secured as shown at suitable places designated 21 to the brake bands 15 are adapted to slidably receive pistons 22 between which and abutments 23 secured to the opposite end of the brake band, connecting rods or links 24 are connected by pivotal connections 25 and 26, respectively.

The brake band in turn is relatively stationarily secured in any suitable manner as, for instance, as described and claimed in my copending application Serial No. 301,454, filed Aug. 23, 1928, to what may be termed a torque arm 27, which in turn is relatively stationarily secured to some relatively stationary portion of the tractor such as the adjustable mount for the sprocket described and claimed in my said Patent No. 1,583,157. The fluid pressure supply pipes 18 and 18' preferably pass through the adjustable mount for the sprocket and thence to mechanism to be later described, while each overflow pipe 19 likewise passes through the adjustable mount and terminates as shown at 28. With the exception of a special construction of the brake cylinders and brake pistons to facilitate filling the brakes with a fluid such as oil, they will not and need not be further described herein. If a further understanding of them is desired, reference may be had to my copending application Serial No. 301,454 above noted, in which their construction and arrangement are illustrated, described and claimed.

Brakes are arranged to be applied simultaneously for braking or selectively for steering and if desired, simultaneously but differentially for both braking and steering through a fluid pressure generating and control mechanism or apparatus which will now be described, reference being had principally to Fig. 2 of the drawings. This brake applying and steering control mechanism or apparatus comprises in general a combination emergency brake and pump mechanism generally designated 29 operated by a hand lever 31, a fluid supply or storage reservoir or tank 32, a master or control cylinder generally designated 33 which may be referred to herein as a fluid receiving chamber or as a fluid pressure generator, operated by the usual steering wheel 34 and steering column 35, and suitable interconnecting piping and valves to which specific reference will be made as this description proceeds.

Preferably oil is the fluid used in the braking and steering system and the tank 32 is desirably of sufficient capacity to provide the amount of oil necessary completely to fill the system and leave a reasonable surplus for replacement in case of leaks or accidents. A conduit or pipe 36 leads from the supply tank 32 through a two-way hand operable valve 37 having a handle 38, and a check valve 39 to the interior of chamber 41 formed within one end of the cylinder 42 forming part of the emergency brake and pump unit 29. A close fitting plunger or piston 43 is reciprocably mounted within the cylinder 42 and adapted to be forced, through operation of the hand lever 31, into the chamber 41 to displace the oil therein and force the oil past a check valve 44, through the conduits or pipes 45 and 46 and valve 47 having a handle 48 to the master or control cylinder 33 and thence through the fluid pressure lines 18 and 18' to the left and right-hand brakes.

The hand lever 31 at its lower end is of bell crank shape, having an arm 49 projecting angularly away from the emergency brake and pump cylinder. This arm 49 at its outer end is pivotally connected as at 51 to a link or toggle bar 52 in turn pivotally connected as at 53 to a lug 54 integral with or otherwise secured to the cylinder 42. A stuffing box 55 is provided about the piston or plunger 43 and packing therein is compressed by a stuffing nut 56 in a common manner. A second lug or pair of lugs 57 formed on or secured to the cylinder 42 provides a pivotal connection for a sector-shaped latch member 58 normally held in approximately the position shown by a spring 59 and provided with notches 61 within which a self-locking finger releasable detent latch and latch bar 62 is adapted to engage to hold the lever 31 in adjusted position. It will be observed that upon release of the detent from the notches 61 the hand lever may be swung back and forth between positions designated 31' and 31" for the purpose of putting pressure on the fluid in chamber 41.

The tank 32 is also connected through a conduit or pipe 63, a valve 64 having a handle 65, a conduit 66 in which a valve 67 having a handle 68 is disposed, the conduit 46 and valve 47 with what may be termed pressure generating and equalizing chambers 69 and 71 in opposite ends of the master or control cylinder 33 and thus to the brakes through the pipes or conduits 18, 18', which also connect with the chambers 69 and 71, respectively. The master or control cylinder 33 is, of course, double ended to provide the chambers 69 and 71 and is arranged to receive a double ended displacement or pressure generating plunger 72 one end of which is adapted to be reciprocated within the chamber 69 and the other end of which is adapted to be reciprocated within the chamber 71 to displace or place pressure upon the fluid contained in these chambers.

A pair of parallel spaced links 73 are pivotally connected at corresponding ends of each to a pivot 74 passing through the plunger 72 and cored slots in opposite sides of the master cylinder wall, and to a pivot 75 secured to a crank arm 76. The crank arm 76 is secured to a rock shaft 77, to which a bevel gear 78 is also secured and adapted to be driven through engagement with a bevel pinion 79 secured to the steering column 35. When the steering wheel 34 is rotated the column 35 is rotated and through the gears 78 and 79 the crank 76 and links 73 causes the piston or plunger 72 to be partially moved from one cylinder and into the other.

In Fig. 1 I have rather diagrammatically illustrated preferred locations for the emergency brake and pump unit 29, the oil supply tank or reservoir 32, and the steering and braking control cylinder unit 33 with respect to the steering wheel gear 34, the driving or operators seat 3 and the gear shift lever 81 and their relative locations with respect to each other. As will be noted, the emergency brake and pump mechanism 29 is attached by a suitable bracket 82 to a portion of the body or frame 4 of the tractor and is so disposed that the hand lever 31 projects upwardly slightly forward and to the left of the steering wheel 34 and column 35 when viewed from the driver's seat. The master or control cylinder 33, of course, must be mounted in some suitable location of the body, frame or chassis of the tractor in operative relation to the crank 76 and the brakes 16 are preferably disposed in the positions illustrated for accessibility and for retaining fluid in an advantageous position for filling and draining.

Fig. 2 illustrates diagrammatically the various mechanisms comprising the braking system in their normal operative positions except that the steering wheel 34 has been rotated in a clockwise direction to apply the right-hand front wheel or sprocket brake. Ordinarily, however, when the tractor is moving in a straight line the steering wheel will be in a position where the plunger 72 will project equal distances into the two chambers 69 and 71 and the oil pressure in the two lines 18 and 18' will be substantially equal and practically zero. Oil or other suitable fluid will completely fill the emergency brake and pump chamber 41, the chambers 69 and 71, the pipe lines or conduits connecting the emergency brake and pump with the master or control cylinder and the pipe or conduits 18, 18'.

It will thus be apparent that upon rotation of the hand wheel 34 in a clockwise direction (viewing the same from the driver's seat) the right-hand brake will be applied causing the tractor to turn to the right, while if the steering wheel be rotated in a counterclockwise direction the right-hand brake will be released and the left-hand brake applied causing the tractor to turn to the left. The left-hand brake may also be applied alone merely by retracting the hand lever 31 toward the position indicated at 31" which will force the oil from the chamber 41 through the conduits, the chamber 69 and line 18, to the brake mechanism.

If for any reason it should be desired to apply both brakes simultaneously, this may be accomplished in either of two ways. Under usual circumstances the steering wheel 34 will be rotated in a clockwise direction to apply the right-hand brake, while at the same time the lever 31 will be retracted toward its position indicated in dotted lines in 31" to apply the left-hand brake in the manner above set forth. Should some emergency circumstance arise, as for instance, in parking the tractor on a hill slope or locking the crawler treads from traveling when using the tractor for belt power work, the hand lever 31 may be retracted toward or to its position indicated at 31" to apply both brakes, the plunger 43 serving to displace a sufficient quantity of oil from and place sufficient pressure on the oil in the chamber 41 to apply the left-hand brake and at the same time displace the plunger 72 somewhat from the chamber 69 and project it into the chamber 71 to create enough pressure in the lines 18 and 18' to apply to both brakes.

Through this particular embodiment of my invention an unusually unique feature is accomplished. The tractor or other vehicle may have both or all of its brakes applied to a certain degree, and if there is sufficient power for locomotion, such as is used in holding back a hauled load on a down hill run, it may yet be steered. For instance, assuming that the hand lever 31 is retracted somewhat toward its position indicated at 31" and both brakes illustrated are applied with a reasonable braking force, rotation of the hand or steering wheel 34 either to the right or left will increase the pressure on one of the brakes and lessen the pressure on the other brake, and if the driving power of the tractor is sufficient to overcome, to some degree, the action of the lesser braking force, the tractor will be turned toward the side on which the greater braking force is applied. By these compound pressures set up in the hydraulic fluid by and between the master cylinders and the emergency brake cylinder, the magnitude of the braking force can be controlled on each of the brakes selectively by the hand wheel actuation, thus effectively accomplishing braking and steering control with the same brakes and while thus effectively accomplishing braking and steering control with the same brakes and while holding back on a down hill run.

When it is desired to fill the system with oil, this may be and is preferably accomplished after the following manner. First, the supply tank 32 is filled with an oil suitable for the climatic conditions under which the tractor is likely to be used. The valve 37 is turned until the handle 38 occupies the position indicated in dotted lines at 38' to connect the line 36 with the chamber 41. The valve 64 is closed by moving its handle to the position indicated in full lines at 65, the valve 47 is fully opened by moving its handle to a position slightly beyond its position indicated in dotted lines at 48' and the valve 67 is closed as shown by the dotted position of the handle at 68'.

Next the right-hand brake is disconnected by removal of the pivot pin 26 and the connecting rod 24 is pulled up to a position where the circumferential groove 83 in the piston registers with the end 84 of a by-pass conduit 85 in the wall of the cylinder 17. In this position the opposite end 86 of this by-pass conduit 85 communicates with the overflow conduit 19. This position is illustrated in Fig. 3 and it will be noted that the by-pass 85 is always on the upper side so that any entrained air or other gas may be excluded from the chamber behind the piston 22 and escape through the overflow pipe 19.

In this condition of the system the emergency brake and pump is operated as a force pump for filling the right-hand side of the system and the right-hand brake. The hand lever 31 is moved back and forth between the positions indicated at 31' and 31" until this side of the hydraulic system is completely filled. The system will be completely filled and all air forced out when air bubbles cease to flow from the mouth 28 of the drain pipe 19 and a steady stream of oil begins to flow therefrom. When the right-hand side has been filled the valve 64 is partially opened by moving its handle 65 to the position indicated at 65' and the piston 22 is pushed down into the cylinder and the pin 26 again inserted to connect the connecting rod 24 with its abutment 23. During this latter operation, excess oil is returned through the line 18', the chamber 71, valves 47 and 64 and conduits 46 and 63 to the storage tank 32.

It is next necessary to fill the left-hand brake and the left-hand side of the system. This is preferably accomplished by closing the valves 64 and 47 and opening the valve 67 to its position indicated by the full line handle 68. The left-hand brake cylinder piston is then disconnected in the same manner as the right-hand brake cylinder piston was disconnected, and by pumping the handle 31 the left-hand side of the system and the left-hand brake is filled with oil after the manner described above for the right-hand brake. As soon as the left side is filled the pumping action is ceased with the hand lever 31 at its extreme forward position indicated at 31'. This will give the largest capacity opening in the pump chamber 41 for providing a large capacity therein in case of need when using the pump as an emergency brake.

The valve 64 is again opened and the piston rod and piston are pushed down and the piston rod reconnected with its abutment 23. Both sides of the system, the emergency brake and pump and the chambers 69 and 71, so far as permitted by the position of the piston or plunger 72, are now filled with oil and the next operation necessary to proper functioning of the system for its purposes above described involves balancing the quantity of the hydraulic fluid in the two sides of the system.

The steering wheel 34 is rotated in a counterclockwise direction to apply the left-hand brake firmly. This should occur when the plunger pin 74, which is preferably equi-distantly spaced from the ends of the plunger 72, is about three-fourths of an inch distance beyond its central position between the ends of the cored slots through which it passes or within one-fourth inch of the end of its stroke. If the plunger cannot be moved that far the valve 67 should be slightly opened to allow the excess to go back into the supply tank. When the plunger is positioned correctly the valve 67 is closed. Now the valve 47 is opened and the steering wheel rotated in a clockwise direction until the pin 74 is again about three-fourths of an inch beyond its central position or, as above stated, within one-fourth inch of the end of this stroke. Again, if the amount of oil does not permit this position to be attained, the valve 47 is slightly opened to allow the excess to squirt back into the supply tank under considerable resistance through a slight opening of the valve. This slight opening will permit the fluid to put the right-hand brake on firmly and when the proper plunger position is reached the valve 47 should be tightly closed.

The balancing being completed, the valves 47, 67 and 64 are tightly closed and the pump lever 31 inspected to see that it is at its position 31'. The valve 37 is now closed to the supply line 36 and connected between the line 45 and the chamber 41 by moving its handle to the full line position at 38. The system is now completely filled and adjusted and ready for use.

The plunger 72 is provided with a slot 72' in which the pin 74 may slide from end to end. To prevent leakage of oil along the sides of the plunger between the chambers 69 and 71, packing rings 87 and 88 are provided and firmly clamped in operative position between the end walls of the chambers 69 and 71 and the cylinder casing 89.

Though I have illustrated and described a brake system applied to a single pair of oppositely disposed brakes and an hydraulic control mechanism for operating the brakes, it will be appreciated that many modifications and changes may be made therein without departing from the spirit of the invention or the scope of the appended claims.

I claim:

1. A steering mechanism for vehicles having a pair of wheels oppositely disposed comprising, a steering member, a pair of brakes one for effecting braking on one of said wheels and the other for effecting braking on the other of said wheels, hydraulic means operatively connecting both of said brakes to said steering member for selective operation whereby a predetermined movement of said steering member will hydraulically apply one of said brakes and a second predetermined movement will apply the other of said brakes, and hydraulic means independent of said steering member for applying either one, or both of said brakes independently of movement of said steering member.

2. A steering mechanism for vehicles having a pair of wheels oppositely disposed comprising, a steering wheel, a single brake for each of said wheels for effecting braking thereof, hydraulic means operatively connecting said brakes and steering wheel for selective operation of said brakes whereby movement of said steering wheel in one direction will apply one of said brakes and movement in another direction will apply the other of said brakes, and means independent of said steering wheel for actuating said hydraulic means applying one of said brakes independently of movement of said wheel.

3. A steering and braking mechanism for vehicles having a differentially driven chain tread on each side comprising, a steering wheel, a pair of brakes one for effecting movements of one of said treads and the other for effecting movements of the other tread, hydraulic means operatively connecting both of said brakes to said steering wheel for selective application thereby, and hydraulic means independent of said steering wheel for applying one of said brakes when said steering wheel is operated to apply the other.

4. A steering and braking mechanism for tractors having differentially driven sprocket wheels on opposite sides thereof comprising, a steering wheel, a brake member for one sprocket wheel on one side and a brake member for one sprocket wheel on the other side, said brake members being operatively connected with said steering wheel for selective operation thereby, and hydraulic means including a fluid pressure control lever disposed in proximity to said steering wheel for applying one of said brakes when said steering wheel is operated to apply the other.

5. In an hydraulic braking system for vehicles having steering gear, and a pair of oppositely disposed supporting wheels, a brake mechanism including a cylinder and a fluid operable plunger in the cylinder for applying the brake for each of said wheels, a fluid pressure generator, fluid conduits from said generator to said cylinders, means connected with said generator and steering gear for selectively actuating said generator for selectively subjecting fluid in said conduits to pressure generated in said generator upon predetermined movements of said steering gear and separately actuated means for applying braking pressure in one of said conduits while the other conduit is under braking presssure created in said generator.

6. In an hydraulic braking system for vehicles having steering gear and oppositely disposed supporting wheels, a fluid pressure actuated brake mechanism for each of said wheels, a cylinder, fluid conduits between one end of said cylinder and one of said brake mechanisms and the other end of said cylinder and the other brake mechanism, a plunger reciprocable in said cylinder between the ends thereof and normally situated intermediate the ends of the cylinder, means connecting said plunger and said gear for moving said plunger toward either end of said cylinder upon a predetermined movement of said gear and means independently actuable of the first said means for applying fluid pressure to either conduit selectively.

7. In an hydraulic braking system for vehicles having steering gear and oppositely disposed supporting wheels, a fluid pressure actuated brake mechanism for each of said wheels, a cylinder, fluid conduits between one end of said cylinder and one of said brake mechanisms and the other end of said cylinder and the other brake mechanism, a plunger reciprocable in said cylinder between the ends thereof and normally situated intermediate the ends of the cylinder, means connecting said plunger and said gear for moving said plunger toward either end of said cylinder upon a predetermined movement of said gear, and means for exerting pressure on the fluid in one of said conduits independently of movement of said gear.

8. In an hydraulic braking system for vehicles having steering gear and oppositely disposed supporting wheels, a fluid pressure actuated brake mechanism for each of said wheels, a cylinder, fluid conduits between one end of said cylinder and one of said brake mechanisms and the other end of said cylinder and the other brake mechanism, a plunger reciprocable in said cylinder between the ends thereof and normally situated intermediate the ends of the cylinder, means connecting said plunger and said gear for moving said plunger toward either end of said cylinder upon a predetermined movement of said gear, and means independently actuable for exerting pressure through said cylinder on the fluid in either of said conduits selectively.

9. In an hydraulic braking system for vehicles having steering gear and oppositely disposed supporting wheels, a fluid pressure actuated brake mechanism for each of said wheels, a cylinder, fluid conduits between one end of said cylinder and one of said brake mechanisms and the other end of said cylinder and the other brake mechanism, a plunger reciprocable in said cylinder between the ends thereof and normally situated intermediate the ends of the cylinder, means connecting said plunger and said gear for moving said plunger toward either end of said cylinder upon a predetermined movement of said gear, a second cylinder connected with all of said conduits, a plunger in said second cylinder, and means for operating said plunger for exerting pressure on the fluid in all of said conduits.

In witness of the foregoing I affix my signature.

GEORGE C. JETT.